United States Patent
Nakasone

(10) Patent No.: US 10,248,291 B2
(45) Date of Patent: Apr. 2, 2019

(54) IN-VEHICLE TERMINAL, CONTENT DISPLAY SYSTEM, CONTENT DISPLAY METHOD AND COMPUTER PROGRAM PRODUCT

(71) Applicant: Clarion Co., Ltd., Saitama-shi, Saitama (JP)

(72) Inventor: Wataru Nakasone, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 259 days.

(21) Appl. No.: 15/105,638

(22) PCT Filed: Dec. 15, 2014

(86) PCT No.: PCT/JP2014/083095
§ 371 (c)(1),
(2) Date: Jun. 17, 2016

(87) PCT Pub. No.: WO2015/093425
PCT Pub. Date: Jun. 25, 2015

(65) Prior Publication Data
US 2016/0364100 A1    Dec. 15, 2016

(30) Foreign Application Priority Data
Dec. 18, 2013   (JP) ................................ 2013-261209

(51) Int. Cl.
*B60K 37/02*    (2006.01)
*H04L 29/08*    (2006.01)
(Continued)

(52) U.S. Cl.
CPC ............ *G06F 3/0483* (2013.01); *B60K 37/02* (2013.01); *G06F 3/0482* (2013.01); *H04L 67/12* (2013.01)

(58) Field of Classification Search
CPC ...................................................... G06F 3/048
See application file for complete search history.

(56) References Cited

U.S. PATENT DOCUMENTS

2006/0148512 A1\*   7/2006   Ekholm ................ G06F 3/0488
                                                                      455/550.1
2006/0277472 A1   12/2006   Yodo et al.
(Continued)

FOREIGN PATENT DOCUMENTS

JP      2003-186911 A     7/2003
JP      2006-343884 A    12/2006
(Continued)

OTHER PUBLICATIONS

International Search Report (PCT/ISA/210) issued in PCT Application No. PCT/JP2014/083095 dated Jan. 27, 2015 with English translation (five pages).

(Continued)

*Primary Examiner* — Jennifer N To
*Assistant Examiner* — Liang Y Li
(74) *Attorney, Agent, or Firm* — Crowell & Moring LLP

(57) ABSTRACT

An in-vehicle terminal includes: a web browser that includes a plurality of tabs used to load and display a plurality of sets of content in different categories and a launcher tab used to display links to the set of content; a storage unit where the plurality of sets of content to be loaded into the plurality of tabs at the web browser and a settings file with categories into which the set of content are classified indicated therein, are saved; an input unit that accepts a user input; a display unit at which a tab among the plurality of tabs and the launcher tab is displayed; and a control unit that determines a category corresponding to a selected set of content indicated with a link selected via the input unit while the launcher tab is on display at the display unit by referencing the settings file, loads the selected set of content into a tab among the plurality of tabs based upon results of category determination, so as to ensure that the set of content loaded in the plurality of tabs belong to different categories and (Continued)

(A) NAMES OF PARTS (B) BEFORE SWITCH       (C) AFTER SWITCH displays the tab having the selected set of content loaded therein at the display unit.

6 Claims, 14 Drawing Sheets

(51) Int. Cl.
  *G06F 3/0482* (2013.01)
  *G06F 3/0483* (2013.01)

(56) References Cited

U.S. PATENT DOCUMENTS

| | | | |
|---|---|---|---|
| 2007/0067733 A1 | 3/2007 | Moore et al. | |
| 2007/0255464 A1* | 11/2007 | Singh | B60R 25/102 |
| | | | 701/36 |
| 2008/0036586 A1* | 2/2008 | Ohki | G01C 21/362 |
| | | | 340/539.13 |
| 2012/0036441 A1* | 2/2012 | Basir | H04M 1/642 |
| | | | 715/734 |
| 2014/0365263 A1* | 12/2014 | Honeyman | G06Q 10/06315 |
| | | | 705/7.25 |

FOREIGN PATENT DOCUMENTS

| | | |
|---|---|---|
| JP | 2013-90264 A | 5/2013 |
| JP | 5222717 B2 | 6/2013 |
| WO | WO 2006/092464 A1 | 9/2006 |
| WO | WO 2008/094371 A1 | 8/2008 |

OTHER PUBLICATIONS

Japanese-language Written Opinion (PCT/ISA/237) issued in PCT Application No. PCT/JP2014/083095 dated Jan. 27, 2015 (three pages).
European Search Report issued in counterpart European Application No. 14871881.0 dated Aug. 3, 2017 (seven pages).

\* cited by examiner

FIG.2

| CATEGORY | ID NUMBER |
|---|---|
| MUSIC CONTENT | 0~1000 |
| NON-MUSIC CONTENT | 1001~2000 |

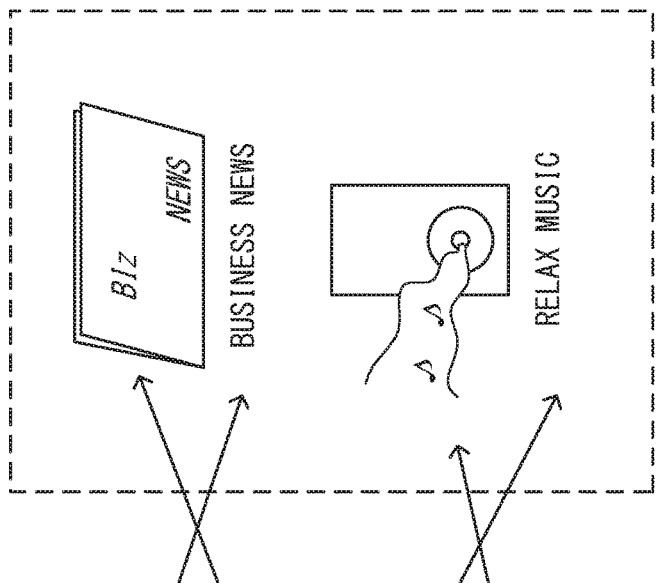

```
<XML>
  <content>
    <name>Business NEWS</name>
    <url>file:///data/biznews.html</url>
    <contentID>1050</contentID>
    <icon>file:///data/icon/biznews.jpg</icon>
  </content>
  <content>
    <name>Relax MUSIC</name>
    <url>file:///data/Rmusic.html</url>
    <contentID>0200</contentID>
    <icon>file:///data/icon/Rmusic.jpg</icon>
  </content>

</XML>
```

(A) LAUNCHER DATA (B) DISPLAY IN LAUNCHER TAB

FIG.4
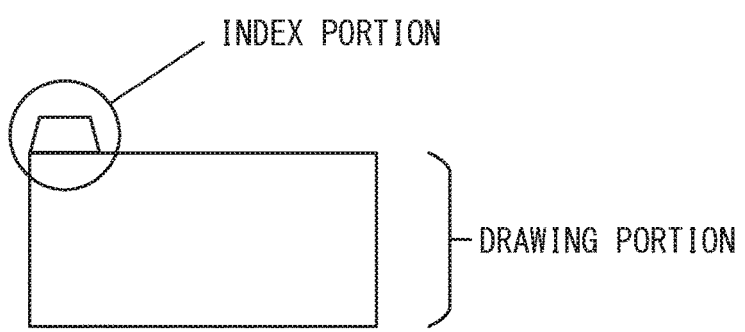
(A) NAMES OF PARTS
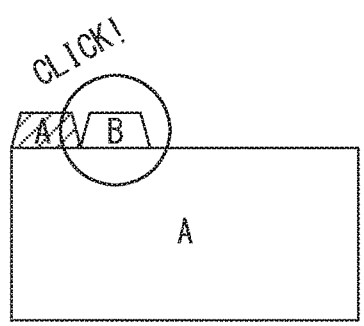
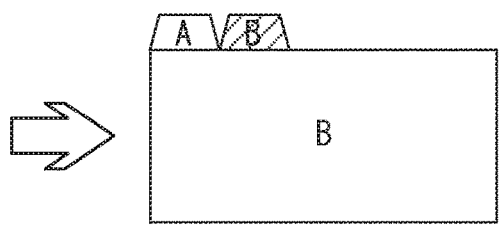
(B) BEFORE SWITCH        (C) AFTER SWITCH

FIG.5
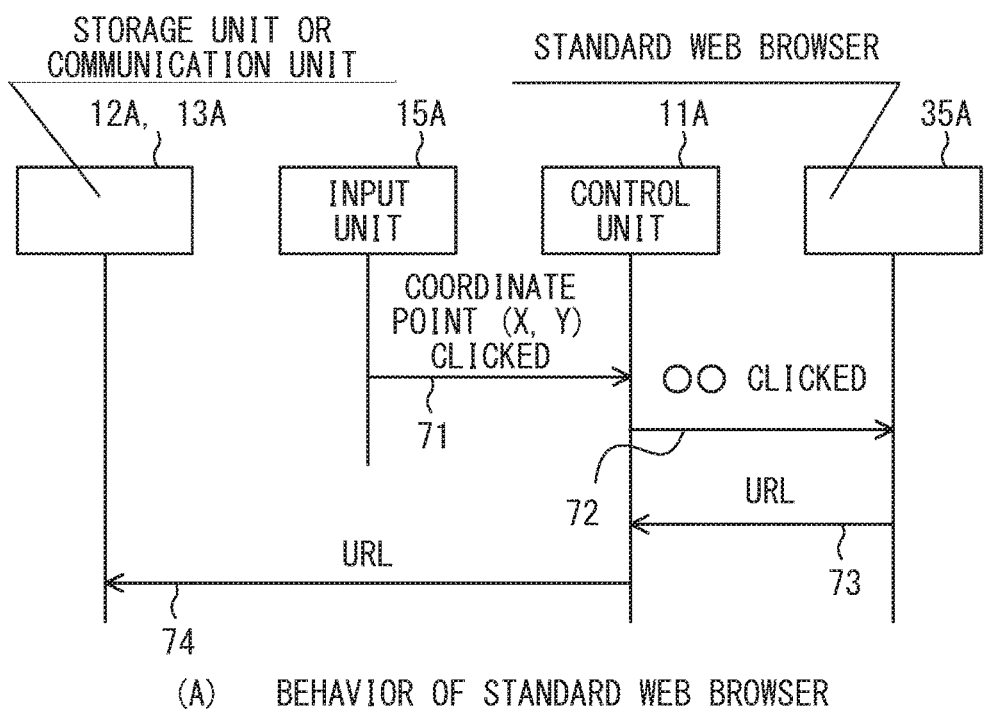
(A) BEHAVIOR OF STANDARD WEB BROWSER
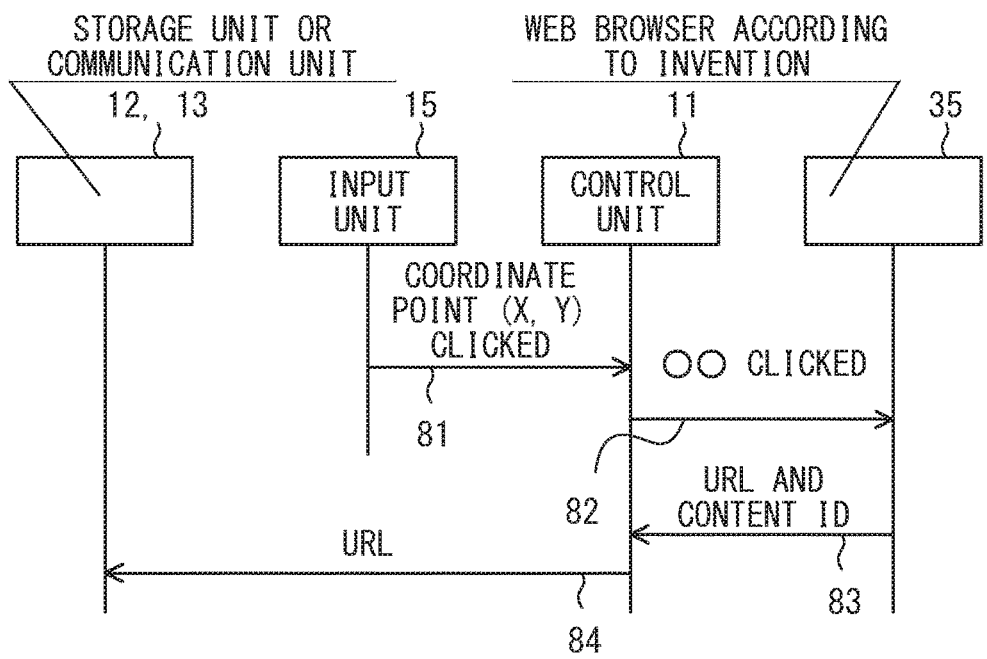
(B) BEHAVIOR OF WEB BROWSER ACCORDING TO INVENTION

IN-VEHICLE TERMINAL, CONTENT DISPLAY SYSTEM, CONTENT DISPLAY METHOD AND COMPUTER PROGRAM PRODUCT

TECHNICAL FIELD

The present invention relates to an in-vehicle terminal, a content display system comprising an in-vehicle terminal and a server, a content display method and a computer program product.

BACKGROUND ART

Against the backdrop of increasing diversification of information communication devices, much interest has been focused on web browsers providing platforms that are not device-dependent, spurring development of content executed on web browsers. When new content is loaded into a web browser, it may be necessary to process older content again to make it possible for the user to view the older content. In other words, the older content cannot be brought up on display quickly. Thus, web browsers capable of switching the content on display, via a plurality of tabs into which different sets of content can be loaded, are used widely as means for addressing the issue described above.

PTL1 discloses an invention that allows new content to be loaded into a given existing tab selected by the user in a web browser having a plurality of tabs.

CITATION LIST

Patent Literature

PTL1: Japanese Patent No. 5222717

SUMMARY OF INVENTION

Technical Problem

It is difficult for a user to specify a tab into which he wishes to have content loaded at a web browser via an in-vehicle terminal that needs to be handled easily.

Solution to Problem

According to the 1st aspect of the present invention, an in-vehicle terminal, comprising: a web browser that includes a plurality of tabs used to load and display a plurality of sets of content in different categories and a launcher tab used to display links to content; a storage unit where the plurality of sets of content to be loaded into the plurality of tabs at the web browser and a settings file with categories into which the set of content are classified indicated therein, are saved; an input unit that accepts a user input; a display unit at which a tab among the plurality of tabs and the launcher tab is displayed; and a control unit that determines a category corresponding to a selected set of content indicated with a link selected via the input unit while the launcher tab is on display at the display unit by referencing the settings file, loads the selected set of content into a tab among the plurality of tabs based upon results of category determination, so as to ensure that the set of content loaded in the plurality of tabs belong to different categories and displays the tab having the selected set of content loaded therein at the display unit.

According to the 2nd aspect of the present invention, it is preferred that in the in-vehicle terminal according to the 1st aspect, the plurality of tabs are each designated to one of the categories; and the control unit loads the selected set of content with the category thereof having been determined into the tab designated to the determined category among the plurality of tabs.

According to the 3rd aspect of the present invention, it is preferred that in the in-vehicle terminal according to the 1st or 2nd aspect, the plurality of sets of content are classified into categories based upon, at least, whether or not a set of content enables music playback.

According to the 4th aspect of the present invention, it is preferred that in the in-vehicle terminal according to any one of the 1st through 3rd aspects, when displaying a plurality of the links in the launcher tab, the control unit displays a link to the selected set of content by adopting a display mode different from a display mode for a link to an unselected set of content.

According to the 5th aspect of the present invention, it is preferred that in the in-vehicle terminal according to any one of the 1st through 4th aspects, when displaying a plurality of the links in the launcher tab, the control unit displays the links by adopting a different display mode for each content category.

According to the 6th aspect of the present invention, comprising: a content display system, comprising: the in-vehicle terminal according to any one of claims 1 through 5; and a server connected with the in-vehicle terminal via a network, wherein: the in-vehicle terminal further comprises an in-vehicle communication unit engaged in communication with the server; at startup of the in-vehicle terminal, the control unit in the in-vehicle terminal issues a request to the server, asking for the settings file and the plurality of sets of content via the in-vehicle communication unit; and the server comprises a server communication unit engaged in communication with the in-vehicle communication unit, a storage unit where the settings file and the plurality of sets of content are saved, and a control unit that transmits the settings file and the plurality of sets of content to the in-vehicle terminal via the server communication unit in response to the request issued by the in-vehicle terminal.

According to the 7th aspect of the present invention, a content display method, comprising: executing a web browser, having a plurality of tabs used to load and display a plurality of sets of content in different categories and a launcher tab used to display links to content; loading the plurality of sets of content to be loaded into the plurality of tabs in the web browser, and a settings file with categories into which the plurality of sets of content are classified indicated therein, from a storage unit; accepting a user input; displaying a tab among the plurality of tabs and the launcher tab at a display unit; and determining a category corresponding to a selected set of content indicated by a link selected in a selection instruction issued via a user input accepted while the launcher tab is on display at the display unit by referencing the settings file, loading the selected set of content into a tabs among the plurality of tabs based upon results of category, so as to ensure that sets of content loaded in the plurality of tabs belong to different categories and displays the tab having the selected set of content loaded therein on display at the display unit.

According to the 8th aspect of the present invention, a computer program product containing a computer program enabling a computer to: execute a web browser, having a plurality of tabs used to load and display a plurality of sets of content in different categories and a launcher tab used to display links to content; load the plurality of sets of content to be loaded into the plurality of tabs in the web browser, and a settings file with categories into which the plurality of sets of content are classified indicated therein, from a storage unit; accept a user input; display a tab among the plurality of tabs and the launcher tab at a display unit; and determine a category corresponding to a selected set of content indicated by a link selected in a selection instruction issued through a user input accepted while the launcher tab is on display at the display unit by referencing the settings file, loaded the selected set of content into a tab among the plurality of tabs based upon results of category determination so as to ensure that sets of content loaded in the plurality of tabs belong to different categories and display the tab having the selected set of content loaded therein at the display unit.

Advantageous Effect of Invention

The present invention makes it possible to load content into an optimal tab at a web browser without requiring any complicated user operation.

DESCRIPTION OF EMBODIMENTS

First Embodiment

In reference to FIGS. 1 through 9, the first embodiment of the present invention will be described.

Figure 1:
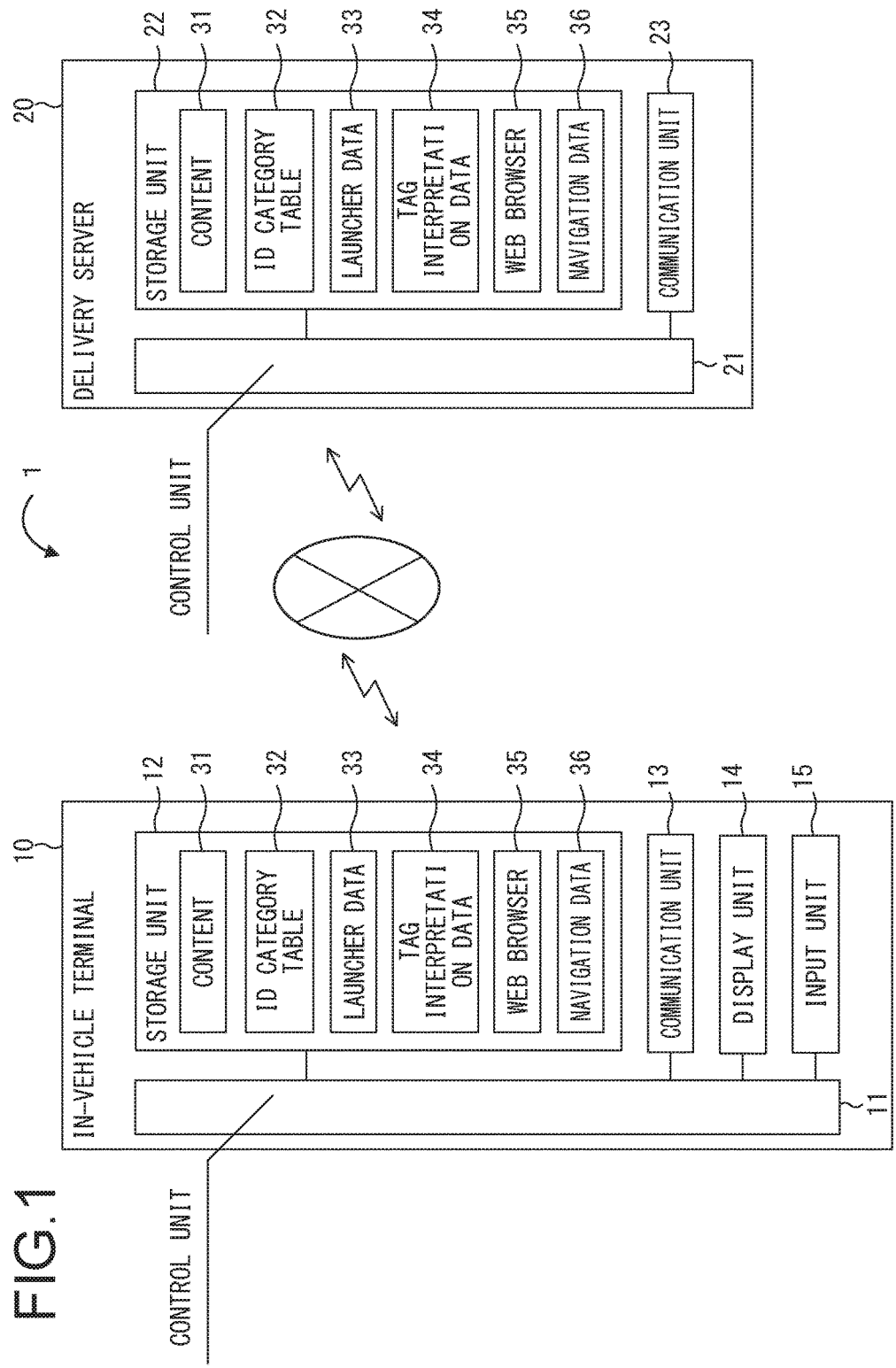
FIG. 1 A block diagram showing the configuration of the content display system achieved in a first embodiment FIG. 2 An example of an ID category table FIG. 3 An illustration showing how launcher data may be written and displayed FIG. 4 An illustration showing how tubs are laid out FIG. 5 Diagrams showing the difference between the web browser according to the present invention and a standard web browser FIG. 6 A transition diagram pertaining to the display unit at the in-vehicle terminal and its conceptual diagram FIG. 7 A flowchart of the launcher tab generation processing FIG. 8 A flowchart of the processing executed when opening new content FIG. 9 flowchart of the operation executed at the delivery server FIG. 10 A flowchart of the processing executed when opening new content in variation 1

FIG. 1 shows the configuration of a content display system 1 achieved in the first embodiment of the present invention. The content display system 1 comprises an in-vehicle (vehicle mounted, or on-board) terminal 10 at which content is displayed and a delivery server 20 that delivers content.

The in-vehicle terminal 10 comprises a control unit 11, ask/rage unit 12, a communication unit 13, a display unit 14 and an input unit 15. The control unit 11 includes a CPU, a ROM and a RAM (not shown). A program enabling operations executed as will be described later in reference to flowcharts is stored in the ROM, and the CPU executes the program by loading the program and the web browser, which will be explained later, in the RAM. When executing the program, the control unit 11 is able to issue, as needed, operation commands to the storage unit 12, the communication unit 13, the display unit 14 and the input unit 15.

In the storage unit 12, configured with a flash memory (not shown), a plurality of sets of content 31, an ID category table 32, launcher data 33, tag interpretation data 34, a web browser 35 and navigation data 36, all to be described below, are saved.

The communication unit 13, connected with the Internet through wireless connection, is able to communicate with the delivery server 20.

At the display unit 14, which includes a liquid crystal display (not shown), data received from the control unit 11 are displayed in response to a command issued by the control unit 11.

Via the input unit 15, which includes a touch panel and buttons not shown), a user input is transmitted to the control unit 11. The touch panel is bonded onto the liquid crystal display at the display unit 14, and as the user touches the touch panel at a given point, the input unit 15 transmits information indicating the coordinates of the contact point on the touch panel to the control unit 11. It is to be noted that since the display position at the display unit 14 and the output from the touch panel are rigorously matched, the coordinates on the touch panel and the coordinates on the display unit 14 may be assumed to exactly match. Namely, the control unit 11 is able to obtain, via the input unit 15, information indicating the coordinates on the display unit 14 matching the position at which the user has touched the display unit 14.

The data saved in the storage unit 12 and the program will be explained next.

A plurality of sets of content 31 stored in the storage unit 12 is loaded into the web browser 35 for display. The individual sets of content 31, written with languages such as HTML, CSS (cascading style sheets) and Java script, may include image data and music data. Such content 31 may be static content used to display text or an image or it may be dynamic content the operation of which is altered in response to an input operation performed by the user. In addition, the term content 31 is able to use not only text and images included in the content 31, but also information saved in the delivery server 20 or another server connected with the Internet (not shown). The content 31 includes, for instance, music playback content that successively plays back specific tunes specified by the user or matching an abstract keyword, destination search content that displays restaurants having been opened during a specific time period specified by the user on a map and news content that displays the latest news.

Information indicating content categories is stored in the ID category table 32, as shown in FIG. 2. While FIG. 2 shows two different category titles and IDs corresponding to each category, there may be three or more categories. In addition, while category titles are included in the figure for clarity, ID category table 32 do not need to bear titles. As will be explained in detail later, the control unit 11, notified of the URL (uniform resource locator) of content 31 and the content ID assigned to the content 31, is able to determine the category designated to the particular content by referencing the ID category table 32. The following description will be given by assuming that integers 0 through 2000 are assigned as IDs and content is sorted into two categories, as shown in FIG. 2.

The launcher data 33, indicating the titles of content 31 that can be loaded into web browser 35, the locations at which the content 31 is saved, the IDs assigned to the content 31 and the locations at which icons corresponding to the individual sets of content 31 are saved, are written in a format that can be understood by a computer, e.g., in a markup language such as XML (extensible markup language). FIG. 3(a) presents examples of launcher data. 33. Information written in XML can be transmitted by using uniquely defined "tags", and five tags: content, name, URL, content ID and icon, are used in the example presented in FIG. 3(a). The "content" tag holds a plurality of sets of information pertaining to each set of content 31, and FIG. 3(a) shows the content tags corresponding to two sets of content 31. The name tag indicates the title of the corresponding set of content 31, the URL tag indicates the URL of the content 31, i.e., information used to identify the content 31, the content ID tag indicates the ID assigned to the content 31 and the icon tag indicates the location from which the icon corresponding to the content 31 is loaded. The meanings of these tags, i.e., the relationship between a given tag and a specific display or operation, are written in the tag interpretation data 34, as will be explained later.

As will be described later, once the launcher data 33 are loaded into the web browser 35 together with the tag interpretation data 34, the descriptions in the launcher data 33 are interpreted and are displayed as a content launcher, as shown in FIG. 3(b) Namely, the icon corresponding to each set of content 31 is loaded from the specified read location and is displayed together with the title of the content 31 provided under the icon. Since the link to the content 31 is attached to the icon and the title, the particular content 31 can be loaded into the web browser 35 from the specified read location in response to a user operation performed to select either the icon or the title.

The tag interpretation data 34, indicating the meanings assigned to the tags used in the launcher data 33 and corresponding display methods, are written in a format that can be read by a computer, e.g., in CSS.

The web browser 35 is loaded into the RAM in the control unit 11 and is then executed by the CPU. The web browser 35 includes a plurality of tabs used to display content 31 and a tab used to display the content launcher with links to the plurality of sets of content 31. The control unit 11 executes processing to be described later based upon a link selected by the user so as to determine a specific tab among the tabs used to display content 31, into which the content 31 is to be loaded for purposes of display at the display unit 14. It then receives the content 31 from the server written in the URL of the content 31 and loads the content 31 into the tab. The web browser 35 stores the URLs of the content 31 having been loaded into individual tabs, and notifies the control unit 11 of the URLs of the content 31 loaded into the tabs in response to a request issued by the control unit 11. The web browser 35 includes a linking function extension, as will be explained later, no as to be able to determine the tab to be designated as the processing target by the control unit 11 based upon a link selection made by the user.

It is to be noted that an URL may assume a format "http://www. example.com/sample.html" or a format "file:///data/sample.html". Provided that the URL of a given set of content 31 assumes the former format, the web browser 35 receives "sample.html" from the server indicated as "www.example.com" by following a predetermined procedure. If the URL of a given set of content 31 assumes the latter format, the particular content 31 is saved at the terminal where the web browser 35 is running, i.e., at the in-vehicle terminal 10, and, accordingly, the web browser 35 loads the content 31 from the storage unit 12 without engaging in communication with any external server.

The navigation data 36 include maps used for car navigation and a calculation program that enable calculation of the length of time required to reach a destination and the distance to be traveled to reach the destination. The calculation program loaded into the RAM in the control unit 11 is executed by the CPU so as to fulfill navigation functions of the known art.

The delivery server 20 in FIG. 1 comprises a control unit 21, a storage unit 22 and a communication unit 23.

The control unit includes a CPU, a ROM and a RAM (not shown). A program enabling operations executed as will be described later in reference to flowcharts is stored in the ROM, and the CPU executes the program by loading the program in the RAM.

In the storage unit 22, configured with a flash memory (not shown), a plurality of sets of content 31, an ID category table 32, launcher data 33, a web browser 35 and navigation data 36, are saved in the storage unit 12. However, the data saved in the storage unit 22 are updated as needed, and a time stamp appended to each set of data is used to determine whether the particular set of data is identical to data saved in the storage unit 12 or has been updated.

The communication unit 23, connected with the Internet through a wired connection, is able to communicate with the in-vehicle terminal 10 wirelessly connected to the Internet.

Before the operations executed in the first embodiment are explained in detail, the titles attached to tabs, the web browser 35 according to the present invention achieved as a functional extension of a standard web browser and an outline of its operations will be described in reference to FIGS. 4 through 6.

A standard web browser with tabs includes an index portion and a drawing portion, as shown in FIG. 4(a). As tabs A and B are opened, index portions corresponding to both the tab A and the tab B are displayed but a single drawing portion corresponding to a specific tab, e.g., the tab A is displayed, as shown in FIG. 4(b). The tab, the drawing portion of which is currently on display will hereafter be referred to as an "active tab", and setting a given tab in an active state will be hereafter described as "activating a tab". The user may select the index portion corresponding to the tab B which is not currently active through a mouse operation or the like so as to activate the tab B and display the drawing portion of the tab B as shown in FIG. 4(c). In addition, generating display data, regardless of whether or not the data are actually displayed, will be hereafter referred to as "drawing".

Furthermore, while the web browser is a program that is loaded into memory for execution and the content 31 to be displayed by the web browser is also loaded into the memory, a special memory area is allocated to each tab. For instance, as content 31 is set in a memory area allocated to a given tab A, the particular content 31 is drawn in the drawing portion of the tab A. Accordingly, setting content 31 in a memory area corresponding to a specific tab will be described as "loading content 31 into a tab" in the following explanation.

The web browser 35 according to the present invention is installed in an in-vehicle device. This means that complicated user operations should be avoided and accordingly, a tab is activated through a method to be described later without requiring the user to make a selection of a specific index portion. In addition, since the user does not need to make a selection of an index portion, the tabs do not include index portions. Since the tabs do not include index portions, displaying the drawing portion of a tab at the display unit will be described as "displaying a tab at the display unit" in the following explanation.

Next, a feature of the present invention achieved by providing the web browser 35 as a functional extension of a standard web browser 35A, i.e., a linking function of the web browser, will be explained in reference to FIG. 5.

A hyperlink function, i.e., a linking function, which is one of the primary functions of the standard web browser 35A, leads to another information resource, and as the standard web browser 35A, instead of the web browser 35 according to the present invention, is engaged in operation, the behavior shown in FIG. 5(*a*) is undertaken in relation to the linking function.

As the user touches a display unit 14A at a given position, an input unit 15A, recognizing the contact as, for instance, a click operation, notifies the corresponding coordinate values to a control unit 11A (arrow 71). If an object such as a link or a button of which the browser needs to be notified is displayed at the clicked coordinate point, the control unit 11A notifies the web browser 35A of the clicked object (arrow 72). While the web browser 35A notified of the object having been clicked executes specific processing defined in correspondence to the particular object, if the object is a link, the standard web browser 35A simply notifies the control unit 11 of the URL of the content 31 set in the link (arrow 73). The control unit 11A, notified of the URL, obtains the content 31 based upon the URL and subsequent processing continues.

As indicated in FIG. 5(*b*), an operation distinct from that described above is executed in the web browser 35 according to the present invention. It receives a notification indicating that an object has been clicked from the control unit 11 (arrow 82), as does the standard web browser 35A. However, if the object is a link, it notifies the control unit 11 of the content ID set in the link as well as the URL of the content 31 set in the link (arrow 83). As shown in FIG. 3, the content ID is written together with the URL of the content 31. The control unit 11 determines the tab into which the content 31 to be newly loaded is to be displayed based upon the content ID and issues a request for the content 31 to the storage unit 12 or the communication unit 13 based upon the URL. Subsequent processing is then executed continuously.

As described above, the web browser 35 according to the present invention is distinguishable from a standard web browser in that it is able to notify the control unit 11 of the content ID as well as the URL of the content 31 set in the link.

Figure 6:
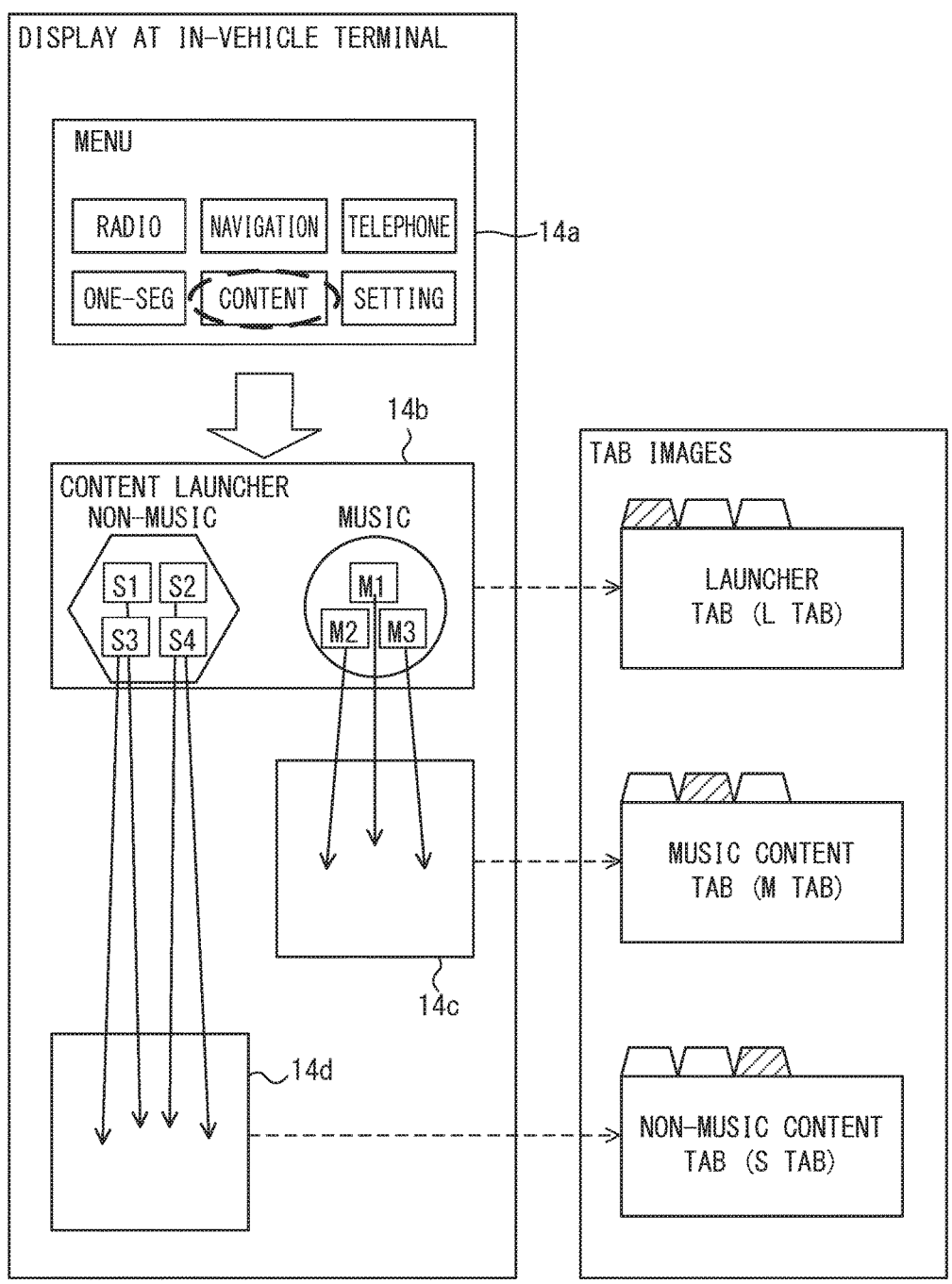

Next, in reference to FIG. 6, the operations executed in the content display system achieved in the first embodiment will be summarized mainly in reference to the display brought up at the display unit 14, as shown in FIG. 6.

Once the in-vehicle terminal 10 is started up as the ignition key is turned on, the control unit 11 brings up a menu 14*a* that provides a list of functions of the in-vehicle terminal 10, on display at the display unit 14. As the user selects "content" by operating the input unit 15, the web browser 35 is started up by the control unit 11 and a content launcher 14*b* is displayed at the display unit 14.

In the example presented in FIG. 6, content is sorted into two categories, as indicated in FIG. 2, i.e., music content and non-music content. As indicated in the "TAB IMAGES" in FIG. 6, the web browser 35 generates three tabs at startup. The three tabs are a launcher tab (hereafter referred to as an L tab), a tab for music content (hereafter referred to as an M tab) and a tab for non-music content (hereafter referred to as an S tab). At startup, the L tab is activated and thus, the content launcher 14*b* is brought up on display at the display unit 14.

In the content launcher 14*b*, the icons and the titles of various sets of content 31 used as links to content 31, are displayed in groups, each corresponding to a specific category, by adopting different display modes for the individual categories, e.g., by assuming a distinct color or a specific shape for each category. As the user selects a title or an icon corresponding to a specific set of content 31, among the titles and icons displayed in the content launcher 14*b*, by operating the input unit 15, the content is loaded into the tab corresponding to the content category, and the particular tab is activated and displayed at the display unit 14, as will be explained in detail later. For instance, if the user selects an icon M1 in the music content category, the content M1 is loaded into the M tab and the M tab thus becomes activated. The following description will be given by assuming that music playback has started in response to a subsequent user operation.

As the user performs an operation at the input unit 15 an as to return to the content launcher 14*b*, the L tab is activated. While the M tab stops being active at this time, the content 31, having been loaded into the M tab is retained and thus, the music playback continues.

Subsequently, as the user selects a title or an icon corresponding to a set of content, the content is loaded into the tab corresponding to the content category and the tab is activated and displayed at the display unit 14, as will be explained in further detail later. If there is content 31 in the tab corresponding to the content category, into which the selected content 31 is to be loaded, already holds content 31 having been loaded previously, the earlier content 31 is discarded and the newer content 31 is loaded into the tab.

For instance, the user may select the icon for music content M2 while the music in the music content M1, having been previously loaded into the tab, is being played back, the music content M1 is deleted from the memory allocated to the M tab and the music content M2 is loaded into the M tab recently vacated by the music content M1. Since the music content M1 is deleted from the memory allocated to the M tab, music playback with the music content M1 ends. However, if the user selects an icon for non-music content S1 instead of the music content M2, the non-music content S1 is loaded into the S tab, thereby activating the S tab, while the music content M1 is continuously held in the memory allocated to the M tab. As a result, the music playback with the music content M1 continues.

The operations executed at the in-vehicle terminal 10 in the first embodiment will be described in detail in reference to FIG. 7 and FIG. 8.

Once the in-vehicle terminal 10 is started up as the ignition key is turned on, the control unit 11 brings up the menu 14*a*, providing a list of functions of the in-vehicle terminal 10, on display at the display unit 14. In addition, as it is started up, update processing is executed in the background so as to receive updated data from the delivery server 20. Thus, even while the data update processing is underway or even when the vehicle having the in-vehicle terminal 10 installed therein is in an underground parkade or the like and is unable to communicate with the delivery server 20, the user is able to issue an operation instruction to the in-vehicle terminal 10. A selection of the menu item "content", which needs to be selected in order to display the content launcher 14b, may be disabled until the data update processing is completed or may be enabled by indicating that data are currently being updated.

The in-vehicle terminal 10 checks time stamps each indicating a specific data creation date/time point, for all the sets of data saved in the storage unit 12 and transmits a list of the data creation dates/time points together with the corresponding data titles to the delivery server 20. As will be explained in detail later, the delivery server 20 compares the data creation dates/time points with data creation dates/time points saved in the storage unit 22 at the delivery server 20, and transmits any data under a given data title, bearing a newer creation date/time point to the in-vehicle terminal 10. The in-vehicle terminal 10 receives the data transmitted from the delivery server 20 and replaces the existing data with an older creation date/time point, saved in the storage unit 12, with the data thus received. It is to be noted that since it requires more time to receive content 31, the ID category table 32 and the launcher data 33 are received with priority.

Through the data update processing executed as described above, the data saved in the storage unit 12 at the in-vehicle terminal 10 are updated with the newest data saved in the storage unit 22 at the delivery server 20.

Figure 7:
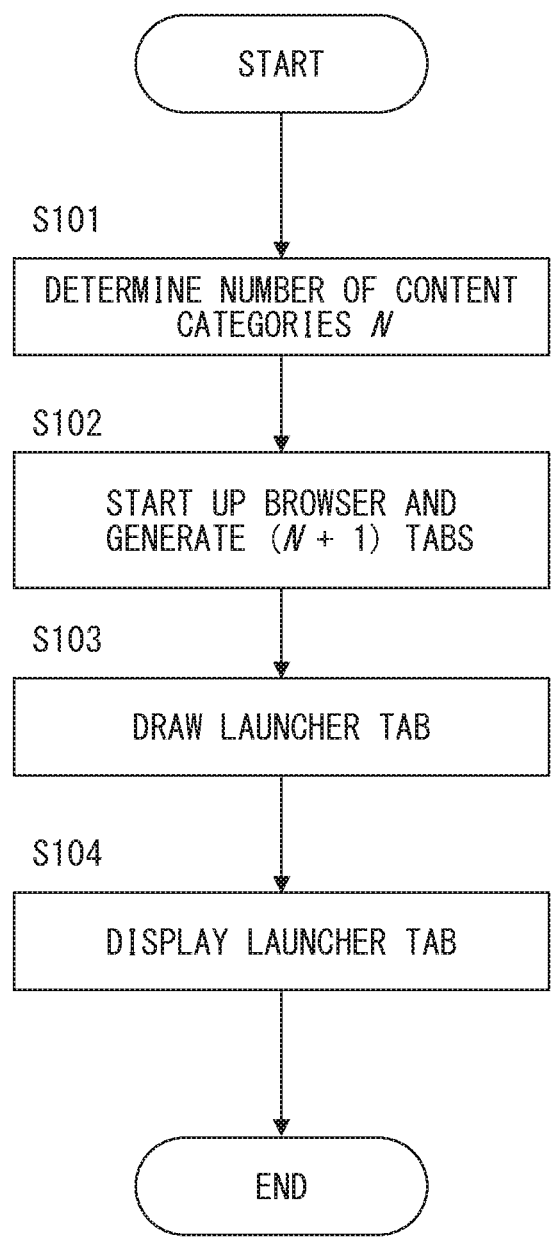

FIG. 7 presents a flowchart of the program operation executed by the control unit 11 at the in-vehicle terminal 10 when "content" is selected on the menu screen in response to a user operation performed at the input unit 15.

In step S101, the control unit 11 loads the ID category table 32 in the storage unit 12 into the RAM and determines the number of different categories into which the content 31 is sorted, before the operation proceeds to step S102. The following explanation will be given by assuming that the content 31 is sorted into two different categories, as has been described in reference to FIG. 2.

In step S102, the control unit 11 loads the web browser 35 in the storage unit 12 into the RAM, thereby activating the web browser 35, and engages the web browser 35 in generation of tabs in a quantity greater than the number of content categories by one, i.e., three tabs, before the operation proceeds to step S103. As in the operational summary provided earlier, the three tabs will be referred to as the L tab, the M tab and the S tab.

In step S103, the control unit 11 loads the launcher data 33 and the tag interpretation data 34 in the storage unit 12 into the L tab in the web browser 35. It then interprets the tags used in the launcher data 33 by referencing the tag interpretation data 34 and draws the content launcher in the L tab based upon the descriptions in the launcher data 33, before the operation proceeds to step S104.

As has been explained in reference to FIG. 3, the icons and titles corresponding to individual sets of content 31 are displayed based upon the descriptions included in the launcher data 33. A link is set in each icon or title, and as the user operates the input unit 15 to select an icon or a title, the URL and the content ID of the corresponding content 31 are reported by the web browser 35 to the control unit 11 as has been described in reference to FIG. 5. It is to be noted that the link is set in the icon and the title of each set of content 31. In this description, the icon or the title may also be referred to as a "link to the content".

In addition, the control unit 11 also references the ID category table 32 saved in the storage unit 12 and displays the icons and the titles of various sets of content 31 in groups each corresponding to a specific content category by adopting different display modes for the individual content categories, as indicated in the content launcher 14b in FIG. 6.

In step S104, the control unit 11 activates the L tab to display the content launcher 14b drawn in the L tab at the display unit 14, before ending the processing in the flowchart in FIG. 7.

Next, in reference to FIG. 8, the operation executed when one of the icons or titles corresponding to the plurality of sets of content 31 displayed in the L tab is selected by the user via the input unit 15 will be explained.

Figure 8:
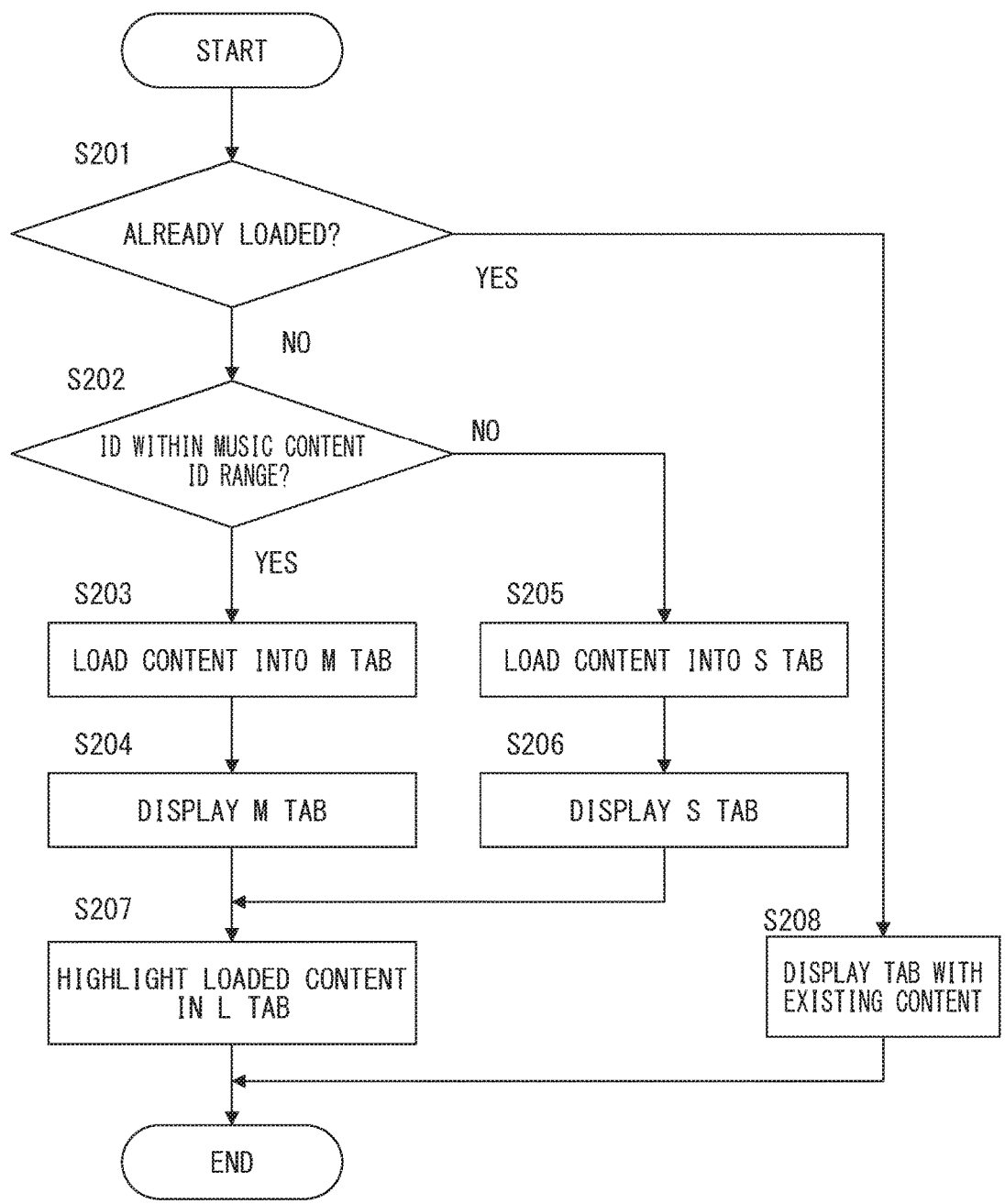

FIG. 8 presents a flowchart of the program operation executed by the control unit 11 when the user selects, via the input unit 15, the icon or title corresponding to a specific set of content 31, displayed in the L tab. As described earlier, once the user selects an icon or title by performing an operation at the input unit 15, the control unit 11 is notified of the URL and the content ID of the particular content 31.

In step S201, the control unit 11 obtains from the web browser 35 the URLs of the content 31 having been loaded into and currently held in all the tabs at the web browser 35 and makes a decision as to whether or not any of the URLs matches the URL of the content 31 of which it has been notified. If the URL of the content 31 of which it has been notified matches any of the URLs of the content 31 having been obtained, the operation proceeds to step S208, whereas if it does not match any of the URLs, the operation proceeds to step S202.

In step S202, the control unit 11 make a decision as to whether or not the content ID of which it has been notified falls within the music content ID number range by referencing the ID category table 32 stored in the storage unit 12. If it is decided that the content ID is within the range, the operation proceeds to step S203, whereas if it is decided that the content ID does not fall within the range, the operation proceeds to step S205.

In step S203, the control unit 11 obtains the content 31 at the content URL of which it has been notified, loads the content 31 into the M tab for music content and draws the content 31 in the M tab, before the operation proceeds to step S204.

In step S204, the control unit 11 activates the M tab and brings up the content 31 having been drawn in the M tab on display at the display unit 14, and then the operation proceeds to step S207.

In step S205, the control unit 11 obtains the content 31 from the content URL of which it has been notified into the tab for non-music content and draws the content 31 in the S tab, before the operation proceeds to step S206.

In step S206, the control unit 11 activates the S tab and brings up the content 31 having been drawn in the tab on display at the display unit 14, and then the operation proceeds to step S207.

In step S207, the control unit 11 redraws the data in the content launcher 14b having been drawn in the L tab so as to highlight the icon and the title of the content 31 having been loaded in step S203 or step S205. Through this processing, an icon frame, for instance, becomes highlighted. Once the processing in step S207 is executed, the processing in the flowchart presented in FIG. 8 ends.

In step S208, the control unit 11 activates the tab into which the content 31 of which it has been notified has already been loaded, so as to bring up the content on display at the display unit 14, and then the processing in the flowchart presented in FIG. 8 ends.

As described above, once the user selects, via the input unit 15, the icon or title of a specific set of content 31 among the content 31 displayed in the L tab, the content 31 corresponding to the icon or the title is loaded into one of the tabs.

It is to be noted that when either the M tab or the S tab is currently in the active state and the corresponding content 31 is on display at the display unit 14, options "return to content list" and "select another content category" may be displayed at the display unit 14. As the user selects either option by performing an operation at the input unit 15, the control unit 11 is able to switch the display by activating the tab corresponding to the user selection. It is to be noted that physical buttons via which instructions "return to content display" and "select another content category" can be issued may be provided as structural elements of the input unit 15.

The operation executed at the delivery server 20 in the first embodiment will be explained in detail in reference to FIG. 9.

Figure 9:
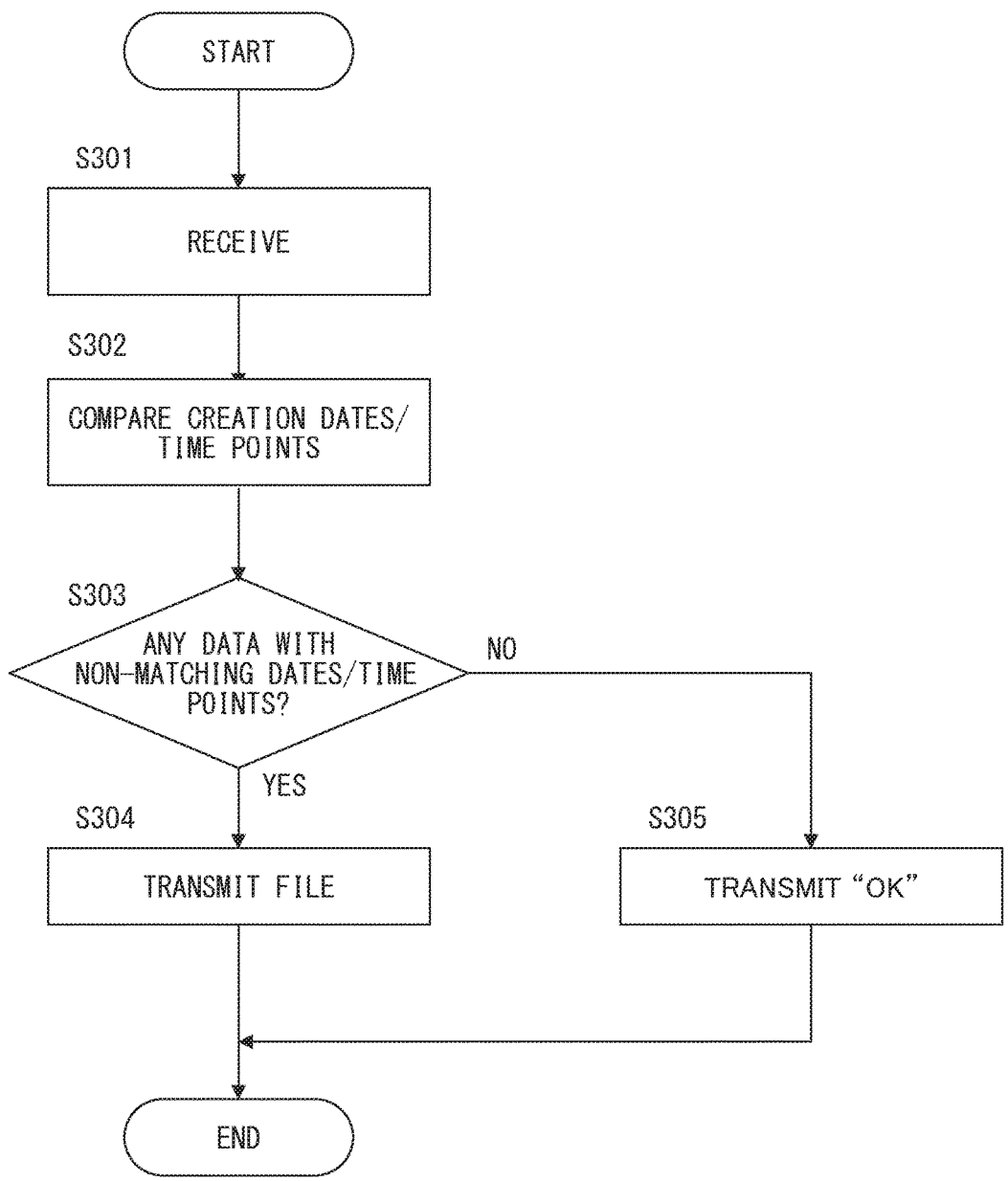

FIG. 9 presents a flowchart of the program operation executed by the control unit 21 in the delivery server 20 when the list of data titles and the corresponding data creation dates/time points is received at the communication unit 23 in the delivery server 20 through communication with the in-vehicle terminal 20.

In step S301, the control unit 21 saves the list with the data, titles and the data creation dates/time points, having been received at the communication unit 23, into the RAM, and then the operation proceeds to step S302.

In step S302, the control unit 21 compares the creation dates/time points indicated in the received list with data update dates/time points pertaining to the data saved in the storage unit 22, and then the operation proceeds to step S303.

In step S303, the control unit 20 makes a decision, based upon the comparison results obtained through step S302, as to whether or not there is any set of data with an unmatched data update date/time point and if it is decided that there is a set of data with an unmatched data update date/time point, the operation proceeds to step S304, whereas if it is decided that an update date/time point match is achieved with regard to all sets of data, the operation proceeds to step S305.

In step S304, the control unit 21 transmits all the data with unmatched data update dates/time points to the in-vehicle terminal 10, before ending the processing in the flowchart shown in FIG. 9.

In step S305, the control unit 21 transmits a message indicating that a data update date/time point match is achieved with regard to all the data to the in-vehicle terminal 10, before ending the processing in the flowchart presented in FIG. 9.

It is to be noted that while only the data with more recent creation dates/time points, compared to those of the corresponding data stored in the storage unit 12 at the in-vehicle terminal 10, are transmitted through the processing described above, so as to minimize the volume of communication data, the in-vehicle terminal 10 may transmit a data request signal to the delivery server 20 at startup and the delivery server 20, having received the signal, may transmit all the data stored in its storage unit instead.

The following advantages and operations are achieved through the content display system 1 in the first embodiment described above.

(1) The in-vehicle terminal 10 includes a web browser 35, a storage unit 12, an input unit 15, a display unit 14 and a control unit 11. The web browser 35 includes a plurality of tabs (hereafter referred to as content tabs) into which a plurality of sets of content 31 in different categories are loaded for purposes of display and a launcher tab used to display the links to content 31. The plurality of sets of content 31 that may be loaded into the content tabs in the web browser 35, an ID category table 32 indicating the content categories, and launcher data 33, i.e., a settings file, are stored in the storage unit 12. A user input is accepted at the input unit 15. A content tab or the launcher tab in the web browser 35 is displayed at the display unit 14. Each content category is assigned to a specific content tab. The control unit 11 identifies the category of selected content indicated with a link selected via the input unit 15 while the launcher tab is on display at the display unit 14 by referencing the ID category table 32 and the launcher data 33, and loads the selected content with the identified category into the tab assigned to the identified category.

In other words, once the user selects a given set of content 31, the control unit 11 loads the particular content 31 into a specific tab corresponding to the category of the content, activates the tab and thus displays the content 31, having been loaded into and drawn in the tab, at the display unit 14. As a result, the content 31 can be loaded into the correct tab without requiring the user to perform any complicated operation.

Since sets of content 31 in a given category are all loaded into a single tab, the number of tabs open at any given time never exceeds the value representing the sum of the number of content categories and one accounting for the launcher tab, even if sets of content 31 are loaded into tabs one after another in response to user selections. Thus, wasteful use of the RAM in the control unit 11 can be prevented without any user knowledge or operation.

Content 31 in a different category can be brought up on display at the display unit 14 as the control unit 11 switches to the corresponding tab for activation and thus, sets of content 31 in varying categories can be used concurrently.

A second or subsequent set of content 31 in a given category is loaded into an existing tab. Since a new tab does not need to be generated, the second or subsequent set of content 31 can be loaded and displayed faster.

(2) Content is categorized at least based upon whether or not a given set of content enables music playback. Since a plurality of sets of music playback content 31 are never loaded at the same time, simultaneous playback of a plurality of tunes, which would confuse the user, does not occur. In addition, if the user selects non-music content 31 while music is being played with music content 31, the non-music content 31 can be loaded and brought up on display while the music continues to play.

(3) The link to the content 31 loaded in any of the tabs is displayed in the launcher tab by the control unit 11 by adopting a display mode different from the mode in which the links to content 31 currently not loaded in any of the tabs are displayed. Namely, among the plurality of links displayed in the launcher tab by the control unit 11, the link to selected content is displayed in a mode different from that for the links to unselect content.

As a result, the user is able to distinguish a set of content 31 having been loaded into a tab from content 31 that has not been loaded.

(4) The links to sets of content 31 are displayed in the L tab by the control unit 11 by adopting different modes, each corresponding to a specific content category. Namely, the control unit 11 displays a plurality of links in the launcher tab by adopting different display modes, each in correspondence to one of the content categories.

The user is thus able to visually check the content categories and easily grasp which sets of content 31 can have loaded at the same time. In addition, since the link to a set of content 31 loaded in one of the tabs is displayed in a mode different from the display mode for the links to unloaded content 31, the user is able to check whether or not there is a set of current content 31 that will be discarded if he selects another set of content 31 to be loaded. This feature is particularly effective in preventing unintended suspension of music playback of a given set of content 31, which would occur if a set of content 31 in the same category as the current content 31 were selected.

(5) The content display system 1 comprises the in-vehicle terminal 10 and a delivery server 20. The in-vehicle terminal 10 includes a communication unit 13 engaged in communications with the delivery server 20. The control unit 11 in the in-vehicle terminal 10 issues a request to the delivery server 20 for an ID category table 32, launcher data 33, i.e., a settings file, and a plurality of sets of content 31, at startup of the in-vehicle terminal 10. The delivery server 20 includes a communication unit 23 engaged in communication with the in-vehicle terminal, a storage unit 22 where the ID category table 32, the launcher data 33, i.e., the settings file, and the plurality of sets of content 31 are saved, and a control unit 21 that transmits, in response to the request from the in-vehicle terminal 10, the ID category table 31, the launcher data 33, i.e., the settings file and the plurality of sets of content 31 to the in-vehicle terminal 10 via the communication unit 23.

Thus, the most recent data available at the delivery server 20 can be obtained at the in-vehicle terminal 10 each time it is started up.

(6) The control unit 11, having been notified of the URL corresponding to a set of content 31, obtains the URLs from the web browser 35 for the sets of content 31 having been loaded into and currently held at all the tabs and loads the set of content 31, the URL of which of which it has been notified only if the URL of the content 31 of which it has been notified does not match any of the URLs of the content 31 in the tabs.

As a result, since a given set of content 31 is not loaded for a second time, initialization of the data, i.e., the content 31 reset to the state when it was first loaded, is prevented. For instance, if a given set of music content 31 is loaded again while the music is being played back with the same content 31, the content 31, having been loaded into the tab earlier will be discarded as the same content 31 is loaded again, resulting in an end to the music playback. Since the same content 31 is loaded again, the same music can be played again but the playback will have to start from the beginning. According to the present invention, if a set of current content 31 already loaded in one of the tabs is selected by the user, the tab in which the content 31 selected by the user has been loaded and is held is activated and displayed at the display unit 14 without loading the same content 31 again.

(Variation 1)

In the first embodiment, content 31 in a given content category is loaded into a pre-assigned tab. As an alternative, the tab in which a set of content 31 in a given category has already been loaded and is held may be identified and closed, and a set of content 31 in the same category may be loaded into a newly generated tab so as to ensure that two or more sets of content 31 in the same category are not loaded at the same time. Namely, a set of content may be loaded into a tab by ensuring that in the plurality of tabs in the web browser 35 each hold a set of content 31 belonging to a category different from that of content 31 having been loaded into any other tab. This processing may be executed as shown in the flowchart presented in FIG. 10 based upon a program.

Figure 10:
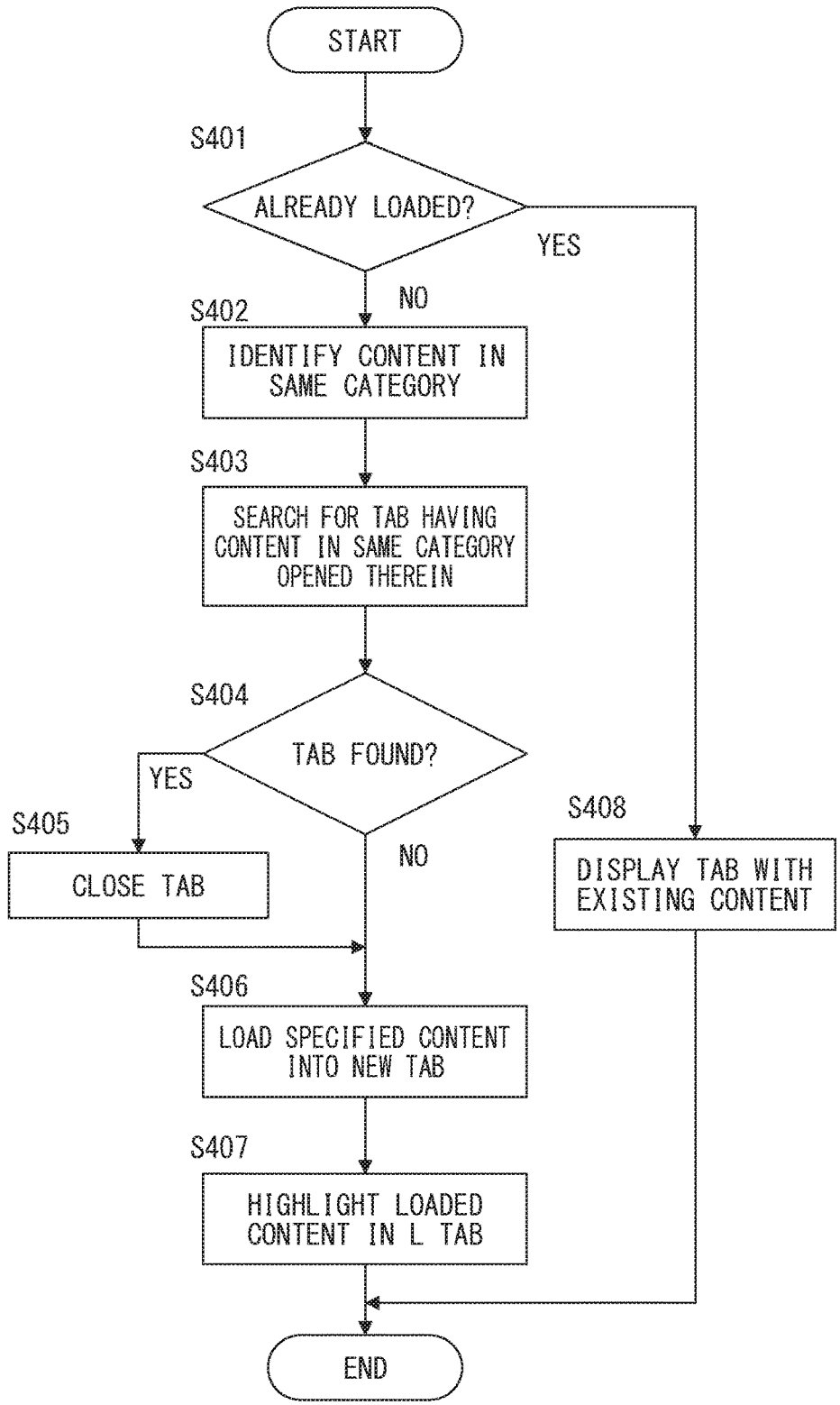

The program enabling the processing in the flowchart presented in FIG. 10 is a program achieved in variation 1 as an alternative to the program enabling the processing in the flowchart in FIG. 8, in reference to which the embodiment has been explained earlier. The processing procedure, is executed in variation 1 when the user selects, via the input unit 15, the icon or the title of one of the sets of content 31 displayed in the L tab, is written in the program. As described earlier, once the user selects an icon or title by performing an operation at the input unit 15, the control unit 11 is notified of the URL and the content ID of the particular content 31.

In step S401, the control unit 11 obtains, from the web browser 35, the URLs of the content 31 having been loaded into and currently held in all the tabs at the web browser 35 and makes a decision as to whether or not any of the URLs matches the URL of the content 31 of which it has been notified. If the URL of the content 31 of which it has been notified matches any of the URLs of the content 31 having been loaded into and currently held in the tabs, the operation proceeds to step S408, whereas if it does not match any of the URLs, the operation proceeds to step S402.

In step S402, the control unit 11 determines the content IDs of content belonging to the category matching that corresponding to the notified content ID by referencing the ID category table saved in the storage unit 12. Next, it references the launcher data 33 so as to identify the URLs of the content 31 belonging to the same category and saves the identified URLs in RAM, before the operation proceeds to step S403.

For instance, the notified content ID may be 10, and in such a case, the ID category table 32 is referenced so as to determine that the content IDs belonging to the same category are 0 through 1000. Next, the launcher data 33 are referenced to search for content 31 assigned with the content IDs 0 through 1000 and the URLs of the content 31 with content IDs falling within this range are all saved into the RAM. The launcher data 33 in FIG. 3 indicate that there is only a single set of content 31 with a content ID falling within the range of 0 through 1000, and accordingly, the URL of the particular content 31 "file:///data/Rmusic.html" is saved into the RAM.

In step S403, the control unit 11 searches through all open tabs in the web browser 305 for a tab where a set of content 31 in the same category as that to which the content 31 with the notified content ID belongs has been loaded, and then the operation proceeds to step S404. In more specific terms, it issues an inquiry to the web browser 35 so as to search for any URL among the URLs of the content 31 that has been loaded into the individual tabs, that matches an URL saved in the RAM.

In step S404, the control unit 11 makes a decision, based upon the results of the search executed in step S403, as to whether or not there is a set of content 31 belonging to the same category as that of the content 31 with the notified content ID that has already been loaded and is held in a tab. If any of the tabs holds content 31 in the same category that has been loaded therein, the operation proceeds to step S405, whereas if none of the tabs holds content 31 belonging to the same category, the operation proceeds to step S406.

In step S405, the control unit 11 closes the tab where the content 31 in the same category as that to which the content 31 with the notified content ID belongs has been loaded, and then the operation proceeds to step S406.

In step S406, the control unit 11 engages the web browser 35 in generation of a new tab and has the content 31, obtained from the notified URL, loaded into the new tab, before the operation proceeds to step S407.

In step S407, the control unit 11 redraws the data in the content launcher 14b having been drawn in the L tab so as to highlight the icon and the title of the content 31 having been loaded in step S406. Through this processing, an icon frame, for instance, is highlighted. Once the processing in step S407 is executed, the processing in the flowchart presented in FIG. 10 ends.

In step S408, the control unit 11 activates the tab into which the content 31 of which it has been notified has already been loaded, so as to bring up the content on display at the display unit 14, and then the processing in the flowchart presented in FIG. 10 ends.

The following advantages and operations are achieved through variation 1 described above.

The control unit 11 identifies the category to which selected content corresponding to a link selected via the input unit 15 belongs while the launcher tab is on display at the display unit 14, by referencing the ID category table 32. Based upon the category identification results, it loads the selected content into one of the plurality of tabs by ensuring that sets of content 31 in different categories are each loaded in one of the plurality of tabs, and brings up the tab on display at the display unit 14.

In other words, once the user selects a given set of content 31, the control unit 11 loads the particular content 31 into a specific tab corresponding to the category of the content, activates the tab and thus displays the content 31 having been loaded into the tab at the display unit 14. As a result, the content 31 can be loaded into the correct tab without requiring the user to perform any complicated operation. In addition, since sets of content 31 in a given category are never loaded into two or more tabs at the same time, the number of tabs open at any time never exceeds the value representing the sum of the number of content categories and 1 accounting for the launcher tab, even if sets of content 31 are loaded into tabs one after another in response to user selections. Thus, wasteful use of the RAM in the control unit 11 can be prevented without the user being aware of the preventative measures being taken. In addition, content 31 with a different category can be brought up on display at the display unit 14 as the control unit 11 switches to the corresponding tab for activation and thus, sets of content 31 with varying categories can be used concurrently.

(Variation 2)

While sets of content are classified into categories based upon whether or not each set of content is used for music playback in the first embodiment, content may be classified into different categories based upon other criteria or by combining the music playback criterion with another criterion. For instance, sets of non-music content may be further classified into categories based upon whether or not information is to be output to the car navigation system.

In variation 2, sets of non-music content are further classified into different categories based upon whether or not information is to be output to the car navigation system and, as a result, content with information to be output to the car navigation system, which fulfills an essential function of the in-vehicle terminal 10, can be provided promptly. For instance, traffic congestion information may be loaded into a tab in the web browser 35 together with music playback content, news content and the like and the various sets of content may be used by switching from one set to another set as needed. In addition, since sets of content 31 with information to be output to the car navigation system are never loaded into tabs at the same time, the user is spared any confusion that might otherwise ensue if a set of information output to the car navigation system was overwritten with another set of information.

(Variation 3)

While sets of content are classified into categories based upon whether or not each set of content is used for music playback in the first embodiment, content 31 that should remain in a ready state at all times and takes a significant length of time to load, e.g., speech recognition content, may be classified into a single independent category. In addition, content 31 that takes a considerable length of time to load, such as speech recognition content, may be loaded into one of the tabs in the web browser 35 when the in-vehicle terminal 10 is started up.

Through variation 3, in which a set of content 31 to remain in the ready state at a tab in the web browser 35 is selected by comparing the importance of various sets of content 31 and taking into consideration the lengths of time required to load the various sets of content 31, the selected content can be used immediately by switching active tabs via the control unit 11 whenever necessary.

(Variation 4)

While tabs are generated in the quantity representing the sum of the number of content categories plus one at startup of the web browser 35 in the first embodiment described above, a single tab may be generated at startup and subsequently, tabs may be generated after the launcher tab is brought up on display or tabs may be generated one at a time as needed.

Through variation 4, the length of time to elapse before the launcher tab is brought up on display is reduced and thus, user's perception of operational response is improved.

(Variation 5)

The web browser 35 in the first embodiment includes a plurality of tabs into which content 31 is loaded and a tab to be activated among them is selected by the control unit 11. As an alternative, a plurality of web browsers with no tabs may be started up, a set of content 31 may be loaded into each of them and the control unit 11 may select a web browser to be displayed in the foreground.

Variation 5 makes it possible to adopt the present invention in conjunction with web browsers that do not employ tabs. In addition, since different web browsers can be used each in correspondence to a specific content category, content 31 in each category can be loaded into an optimal web browser.

(Variation 6)

While an inherent content ID is assigned to each set of content 31 in the launcher data 33 and content categories are defined in correspondence to the individual content IDs in a separate ID category table 32 in the first embodiment, sets of content may be classified through a method other than this. For instance, instead of assigning content IDs, content categories may be directly set for the individual sets of content in, for instance, the launcher data 33.

Through variation 6, the number of sets of reference data can be reduced.

(Variation 7)

In the first embodiment, the URL of a set of content 31 is written as "file:/// . . . " in the launcher data 33, as shown in FIG. 3, and accordingly, the content 31 is loaded from the storage unit 12 at the in-vehicle terminal 10. As an alternative, the URL of the content 31 may instead be written as "http:// . . . " in the launcher data 33 so as to load the content 31 from the delivery server 20 or another server. In such a case, it is desirable that the in-vehicle terminal 10 further include a proxy server function that allows content 31 or the like to be loaded from an external source via the proxy server even while communication with the delivery server 20 or another server is disabled and the content 31 thus cannot be activated as the vehicle travels through a tunnel or the like. Through variation 7, in which content 31 being activated is received from the delivery server 20 or the like, the user is able to use the most up-to-date content 31 at all times.

Second Embodiment

In reference to FIG. 11 through FIG. 13, the second embodiment of the present invention will be described. The following explanation will focus on features distinguishing the embodiment from the first embodiment by assigning the same reference signs to structural features identical to those in the first embodiment. Elements that are not specially noted are identical to those in the first embodiment. The target of the control executed in the first embodiment is display and load of content loaded into the web browser 35, i.e., display and load of text, images and content often referred to as web applications. The second embodiment is distinct in that its control target is display and load of programs started up independently of the web browser 35, i.e., display and load of native applications.

The configuration of a content display system 1 achieved in the second embodiment will be described next.

Figure 11:
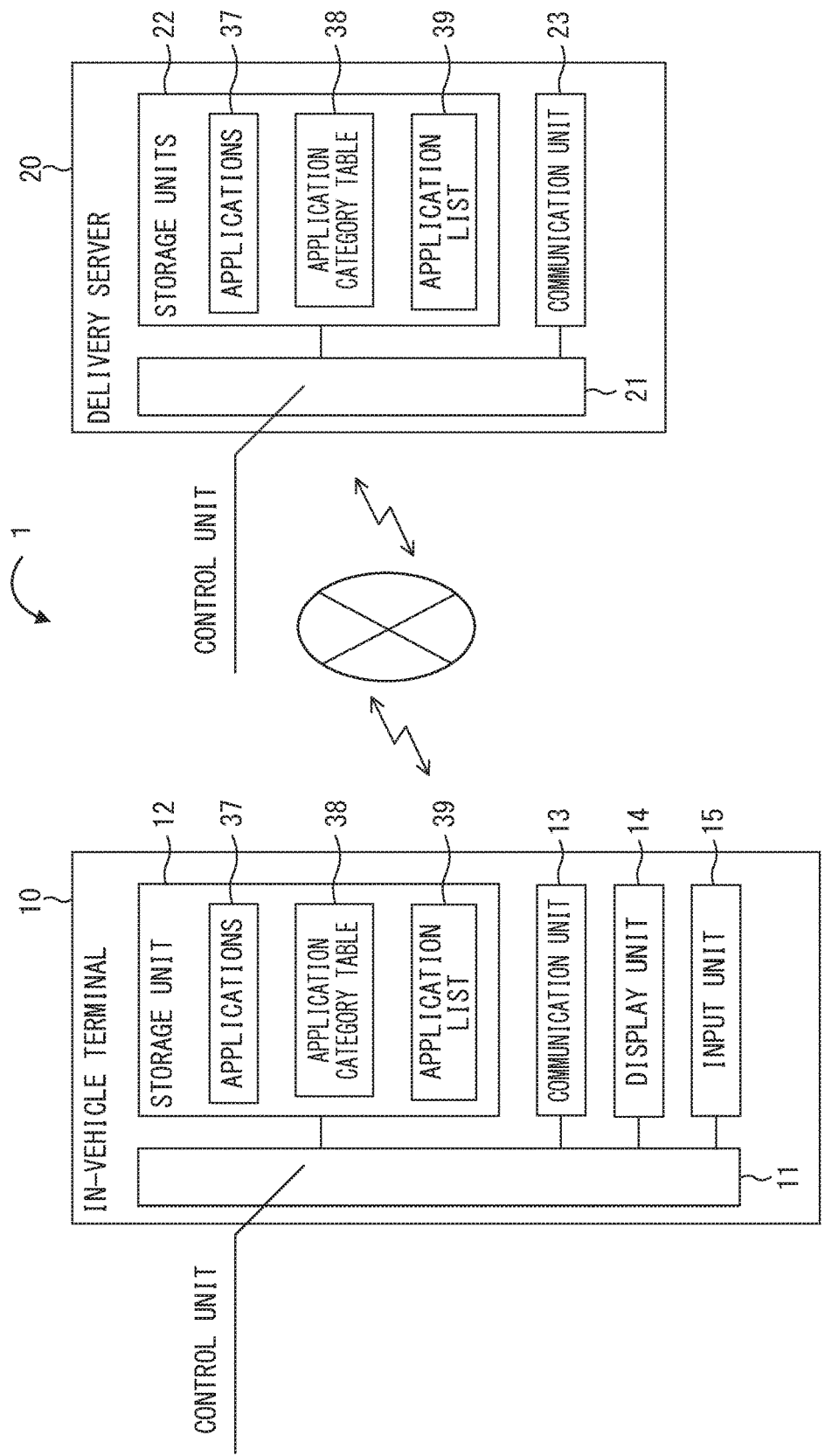
FIG. 11 A block diagram showing the configuration of the content display system achieved in a second embodiment FIG. 12 An example of an application category table FIG. 13 A flowchart of the processing executed when opening a new application FIG. 14 An illustration showing how a program may be provided to the in-vehicle terminal

FIG. 11 shows the configuration of the content display system 1 achieved in the second embodiment of the present invention. It is different from the content display system in the first embodiment in the types of data saved in the storage unit 12 and the storage unit 22.

A plurality of applications 37, an application category table 38 and an application list 39 are saved in the storage unit 12.

An application 37 is loaded in the RAM in the control unit 11 and is executed by the CPU. The applications 37 may include, for instance, a music playback program that successively plays back specific tunes specified by the user or tunes corresponding to an abstract keyword, a destination search program that displays on a map restaurants having opened during a predetermined period of time specified by the user and a news display program that displays the latest news.

Figure 12:

The application category table 38 lists the titles of the applications 39 in correspondence to each category, as shown in FIG. 12. FIG. 12 indicates that "AAA.exe", "BBB.exe" and "CCC.exe" are classified into one category, and "PPP.exe", QQQ.exe" and "RRR.exe" belong to another category.

The application list 39 is a list of applications 37 installed in the in-vehicle terminal 10 and provides a shortcut to any of the plurality of applications 37 saved in, for instance, the storage unit 12.

The operations executed in the second embodiment will be explained next.

In addition to the functions of the control unit in the first embodiment, the control unit 11 in the in-vehicle terminal 10 has the following two functions. The first function is an active application list creation function, which makes it possible to obtain a list of the titles of applications 37 currently active at the in-vehicle terminal 10. The second function is an end signal transmission function that makes it possible to transmit a signal to be used to end execution of an application 37 active at the in-vehicle terminal 10, to the application 37.

The control unit 11 controls activation and display of an application 37 as described below. A program enabling the processing in the flowchart in FIG. 13 is started up before the control unit 11 activates an application selected through an operation performed at the input unit 15 by the user. Namely, an application 37 selected by the user is only activated after the processing in the flowchart presented in FIG. 13, enabled by the program, is executed.

In step S501, a list of active applications 37 at the in-vehicle terminal 10 is obtained through the active application list creation function. A decision is then made as to whether or not the list includes the application 37 selected by the user. If the list includes the application 37 selected by the user, the particular application 37 is brought up on display at the display unit 14 and the processing in the flowchart presented in FIG. 13 ends, whereas if the list does not include the selected application, the operation proceeds to step S502.

In step S502, the control unit 11 identifies any application belonging to the category matching that of the application selected by the user by referencing the application category table 38 in the storage unit 12, and then the operation proceeds to step S503. For instance, if the user has selected the application "AAA.exe" among the applications in the application category table 38 in FIG. 12, "BBB.exe" and "CCC.exe" are identified as applications belonging to the same category.

In step S503, the control unit 11 searches through the list of active applications obtained in step S501 for any application 37 identified in step S501, before the operation proceeds to step S504.

In step S504, the control unit 11 makes a decision based upon the results of the search performed in step S503, as to whether or not any application 37 belonging to the same category as the application 37 selected by the user is currently active. If an application 37 belonging to the same category is active, the operation proceeds to step S505, whereas if no application belonging to the same category is active, the operation proceeds to step S506.

In step S505, the control unit 11 ends the application 37 belonging to the same category as that of the application selected by the user by engaging the end signal transmission function described earlier, and then the operation proceeds to step S506.

Figure 13:
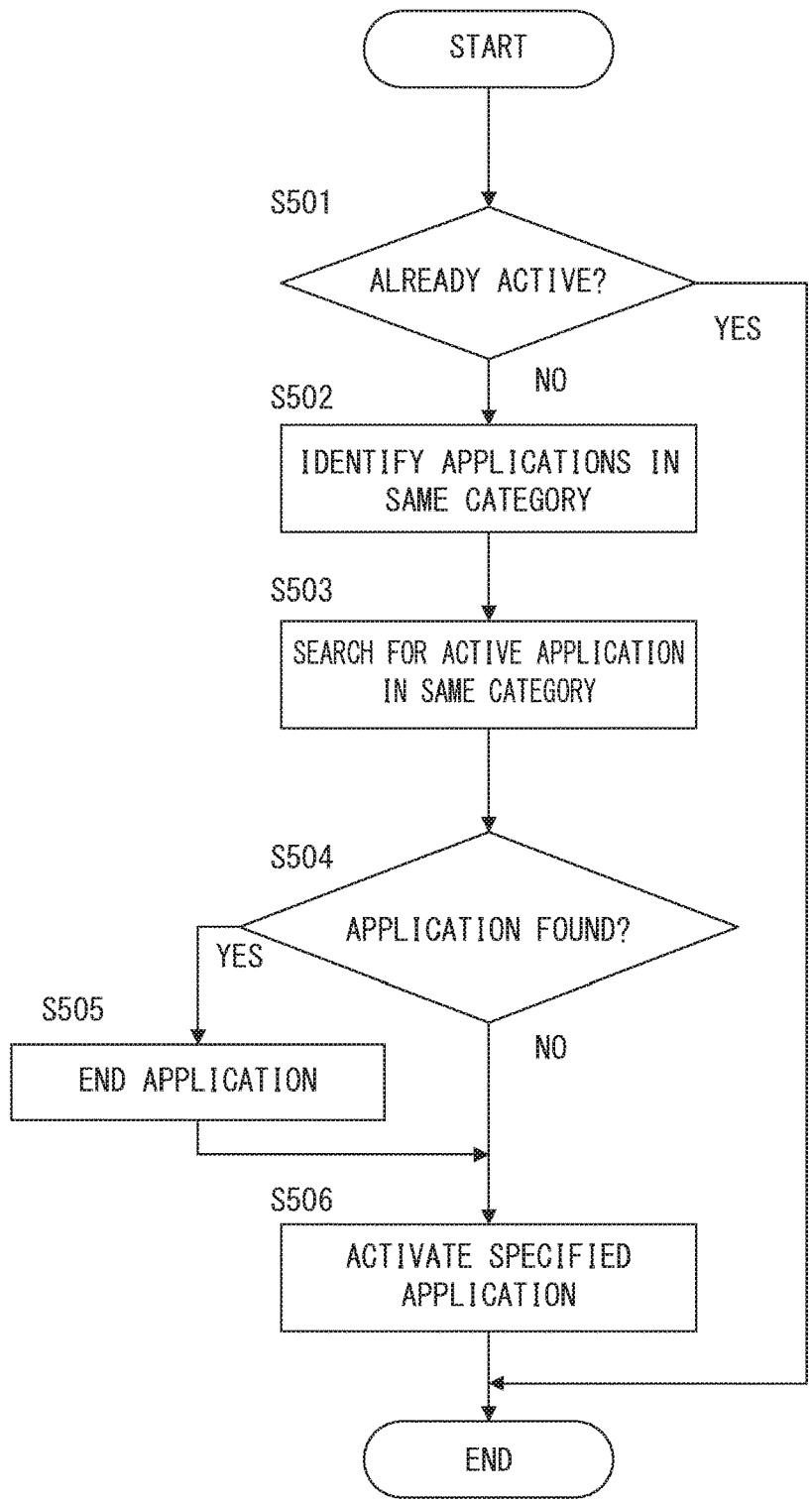

In step S506, the control unit 11 loads the application 37 selected by the user in the RAM in the control unit 11, starts execution thereof and displays the application 37 at the display unit 14, before ending the processing in the flowchart presented in FIG. 13.

The following advantages and operations are achieved through the second embodiment described above.

The in-vehicle terminal 10 comprises a storage unit 12, an input unit 15, a display unit 14 and a control unit 11. In the storage unit 12, a plurality of applications 37 and an application category table 38 are stored. The input unit 15 accepts a user input. An application among the plurality of applications 37 is displayed at the display unit 14. When activating an application 37 selected through an operation performed by the user at the input unit 15, the control unit 11 references the application category table 38, and if an application 37 belonging to the same category has already been activated, it first ends the currently active application 37 before it activates the application 37 selected by the user and brings it up on display at the display unit 14.

This means that since only a single application 37 in a given category is active at any given time, the user is spared any confusion that would otherwise occur if a plurality of applications 37 in the same category were active at the same time.

Figure 14:
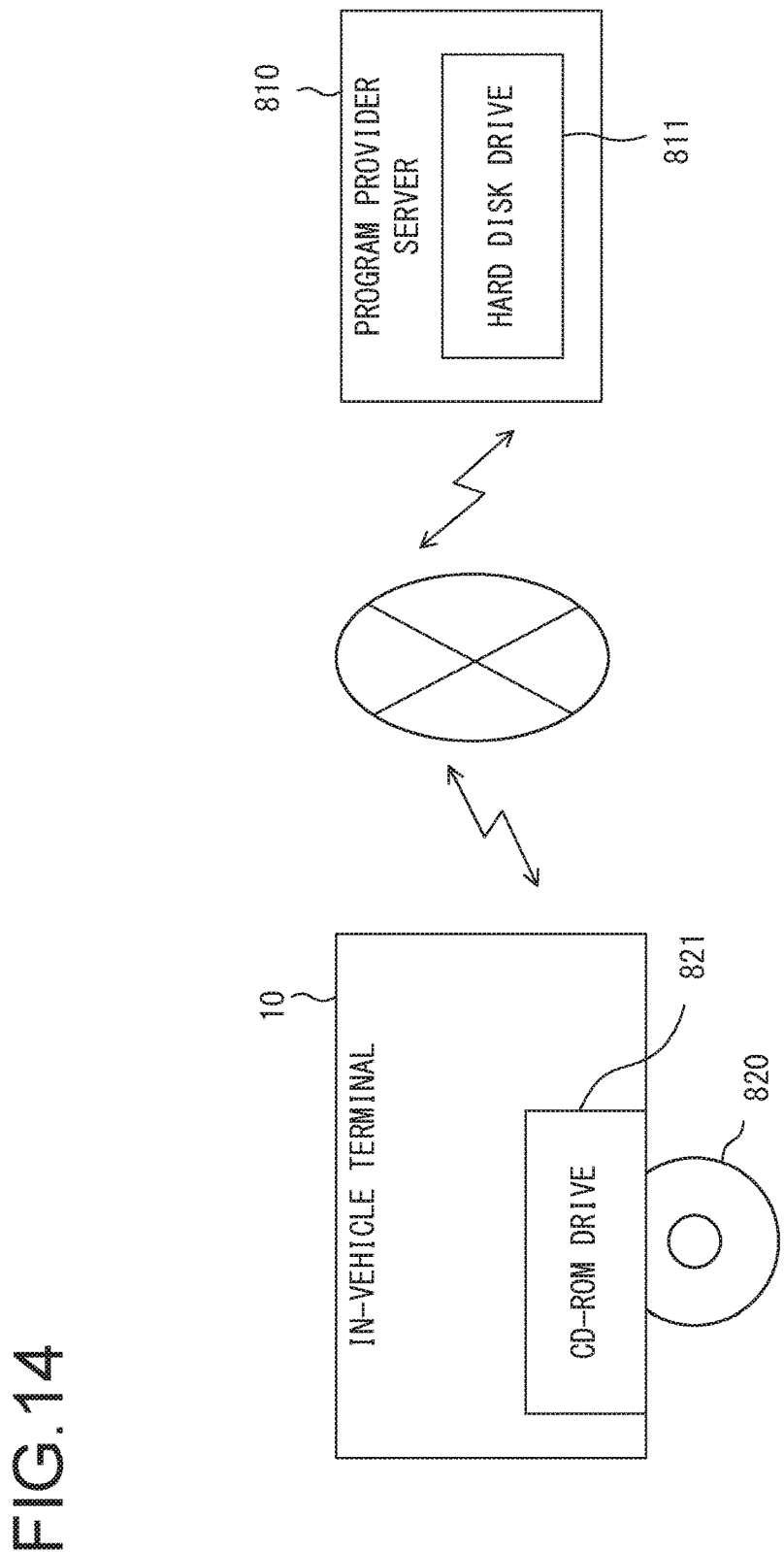

The program executed by the control unit 11 at the in-vehicle terminal 10 in any of the embodiments and variations thereof described above may be provided in a recording medium such as a CD-ROM or through a data signal on the Internet or the like. FIG. 14 illustrates how the program may be provided.

The program mentioned above is stored in a CD-ROM 820. The in-vehicle terminal 10 includes a CD-ROM drive 821, which loads the program stored in the CD-ROM 820 into the storage unit 12. A program provider server 810 is a server computer that provides the program stored in a recording medium such as a hard disk drive 811. That program provider server 810 reads out the program from the hard disk 811 and transmits the program thus read out to the in-vehicle terminal 10 via a communication line. Namely, the program embodied as a data signal is transmitted on a carrier wave via the communication line. In other words, the program may be provided as a computer-readable computer program product adopting any of various modes including a recording medium and a data signal (carrier wave).

The embodiments and variations thereof described above may be adopted in any combination.

In addition, as long as the functions characterizing the present invention remain intact, the present invention is in no way limited to any of the structural details described in reference to the embodiments.

It is to be noted that the present invention also relates to a content display method comprising the following procedures. Namely, the content display method according to the present invention comprises an execution procedure through which a web browser, having a plurality of tabs used to load and display a plurality of sets of content in different categories and a launcher tab used to display links to content, is executed, a load procedure through which a plurality of sets of content to be loaded into the plurality of tabs in the web browser, and a settings file with content categories indicated therein, are loaded, an input procedure through which a user input is accepted, a display procedure through which a tab among the plurality of tabs and the launcher tab is displayed at a display unit and a control procedure through which a category corresponding to selected content indicated by a link selected in a selection instruction issued through the input procedure while the launcher tab is on display at the display unit is determined by referencing the settings file, the selected content is loaded into a tab among the plurality of tabs based upon results of category determination, so as to ensure that sets of content loaded in the plurality of tabs belong to different categories and the tab having the selected content loaded therein is brought up on display at the display unit.

The present invention also relates to a web browser that executes the following steps. Namely, the web browser executes an execution step in which the web browser, having a plurality of tabs used to load and display a plurality of sets of content in different categories and a launcher tab used to display links to content, is executed, a load step in which a plurality of sets of content to be loaded into the plurality of tabs in the web browser, and a settings file with content categories indicated therein, are loaded, an input step in which a user input is accepted, the display step in which a tab among the plurality of tabs and the launcher tab is displayed at a display unit and a control step in which a category corresponding to selected content indicated by a link selected in a selection instruction issued through the input procedure while the launcher tab is on display at the display unit is determined by referencing the settings file, the selected content is loaded into a tab among the plurality of tabs based upon results of category determination so as to ensure that sets of content loaded in the plurality of tabs belong to different categories and the tab having the selected content loaded therein is brought up on display at the display unit.

The disclosure of the following priority application is herein incorporated by reference:
Japanese Patent Application No. 2013-261209, filed Dec. 18, 2013

REFERENCE SIGNS LIST

1 . . . content display system, 10 . . . in-vehicle terminal, 11 . . . control unit, 12 . . . storage unit, 13 . . . communication unit, 14 . . . display unit, 15 . . . input unit, 20 . . . delivery server, 21 . . . control unit, 22 . . . storage unit, 23 . . . communication unit, 31 . . . content, 32 . . . ID category table, 33 . . . launcher data, 34 . . . tag interpretation data, 35 . . . web browser, 36 . . . navigation data, 37 . . . application, 38 . . . application category table, 39 . . . application list

The invention claimed is:
1. A content display system, comprising:
an in-vehicle terminal, comprising:
  a web browser that includes a plurality of tabs used to load and display a plurality of sets of content in different categories, including at least one of music playback content destination search content, news content, and speech recognition content, and a launcher tab used to display links to content;
  a storage unit where the plurality of sets of content to be loaded into the plurality of tabs at the web browser and a settings file with categories into which the sets of content are classified are saved;
  an input unit that accepts a user input;
  a display unit at which a tab among the plurality of tabs and the launcher tab is displayed; and
  a control unit that determines a category corresponding to a selected set of content indicated with a link selected via the input unit while the launcher tab is on display at the display unit by referencing the settings file, loads the selected set of content into a tab among the plurality of tabs, based upon results of category determination, to ensure that the set of content loaded in the plurality of tabs belong to different categories and displays the tab having the selected set of content loaded therein at the display unit,
wherein a plurality of tabs is simultaneously displayed,
a server connected with the in-vehicle terminal via a network, wherein: the in-vehicle terminal further comprises an in-vehicle communication unit engaged in communication with the server;
at startup of the in-vehicle terminal, the control unit in the in-vehicle terminal issues a request to the server, asking for the settings file and the plurality of sets of content via the in-vehicle communication unit; and the server comprises
  a server communication unit engaged in communication with the in-vehicle communication unit,
  a storage unit where the settings file and the plurality of sets of content are saved, and
  a control unit that transmits the settings file and the plurality of sets of content to the in-vehicle terminal via the server communication unit in response to the request issued by the in-vehicle terminal.

2. The in-vehicle terminal according to claim 1, wherein:
the plurality of tabs are each designated to one of the categories; and
the control unit loads the selected set of content with the category thereof having been determined into the tab designated to the determined category among the plurality of tabs.

3. The in-vehicle terminal according to claim 1, wherein:
the plurality of sets of content are classified into categories based upon, at least, whether or not a set of content enables music playback.

4. The in-vehicle terminal according to claim 1, wherein:
when displaying a plurality of the links in the launcher tab, the control unit displays a link to the selected set of content by adopting a display mode different from a display mode for a link to an unselected set of content.

5. The in-vehicle terminal according to claim 1, wherein:
when displaying a plurality of the links in the launcher tab, the control unit displays the links by adopting a different display mode for each content category.

6. A content display method, comprising:
providing an in-vehicle terminal comprising:
a web browser that includes a plurality of tabs used to load and display a plurality of sets of content in different categories, including at least one of music playback content destination search content, news content, and speech recognition content, and a launcher tab used to display links to content;
a storage unit where the plurality of sets of content to be loaded into the plurality of tabs at the web browser and a settings file with categories into which the sets of content are classified are saved;
an input unit that accepts a user input;
a display unit at which a tab among the plurality of tabs and the launcher tab is displayed; and
a control unit that determines a category corresponding to a selected set of content indicated with a link selected via the input unit while the launcher tab is on display at the display unit by referencing the settings file, loads the selected set of content into a tab among the plurality of tabs, based upon results of category determination, to ensure that the set of content loaded in the plurality of tabs belong to different categories and displays the tab having the selected set of content loaded therein at the display unit,
wherein a plurality of tabs is simultaneously displayed,
providing a server connected with the in-vehicle terminal via a network, wherein the in-vehicle terminal further comprises an in-vehicle communication unit engaged in communication with the server;
at startup of the in-vehicle terminal, the control unit in the in-vehicle terminal issues a request to the server, asking for the settings file and the plurality of sets of content via the in-vehicle communication unit; and the server comprises
a server communication unit engaged in communication with the in-vehicle communication unit,
a storage unit where the settings file and the plurality of sets of content are saved, and
a control unit that transmits the settings file and the plurality of sets of content to the in-vehicle terminal via the server communication unit in response to the request issued by the in-vehicle terminal,
executing the web browser having the plurality of tabs used to load and display the sets of content and the launcher tab used to display the links to content;
loading, from the storage unit, the plurality of sets of content into the plurality of tabs in the web browser, and the categories into which the plurality of sets of content are classified into the settings file;
accepting the user input;
displaying the tab among the plurality of tabs and the launcher tab at the display unit; and
determining, with the control unit, the category corresponding to the selected sets of content indicated by the link selected, loading the selected set of content into the tab among the plurality of tabs, and the tab having selected the set of content at the display unit.

* * * * *